May 29, 1956     P. E. D. DUBIN     2,747,410
MEASURING SCOOP
Filed Feb. 25, 1955
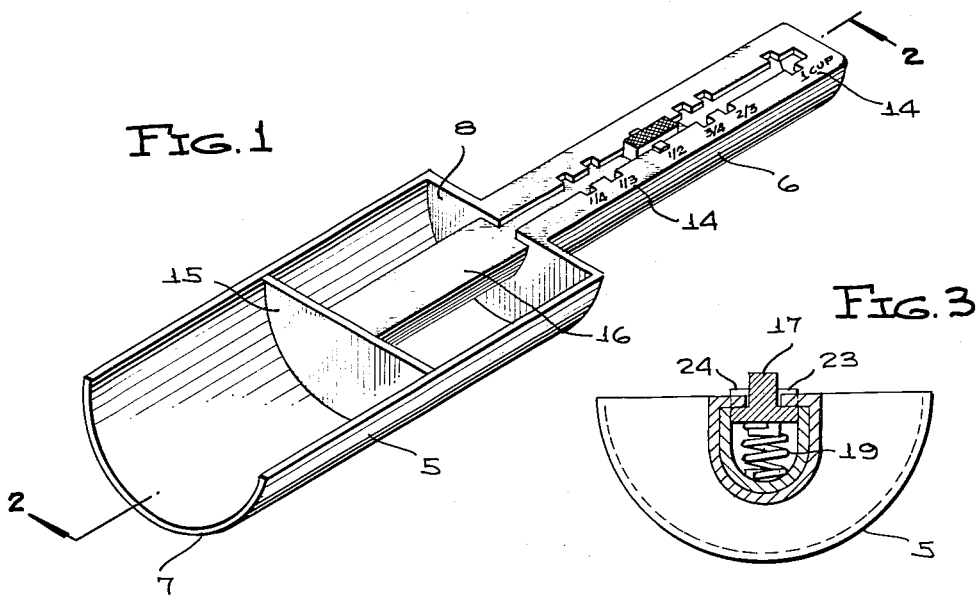
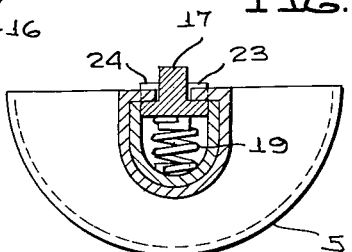
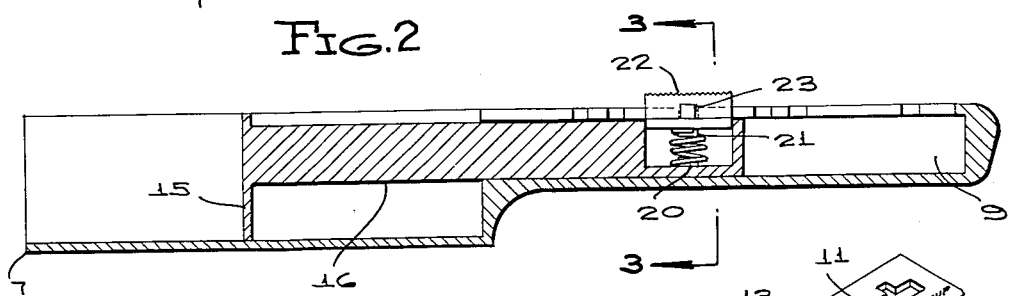
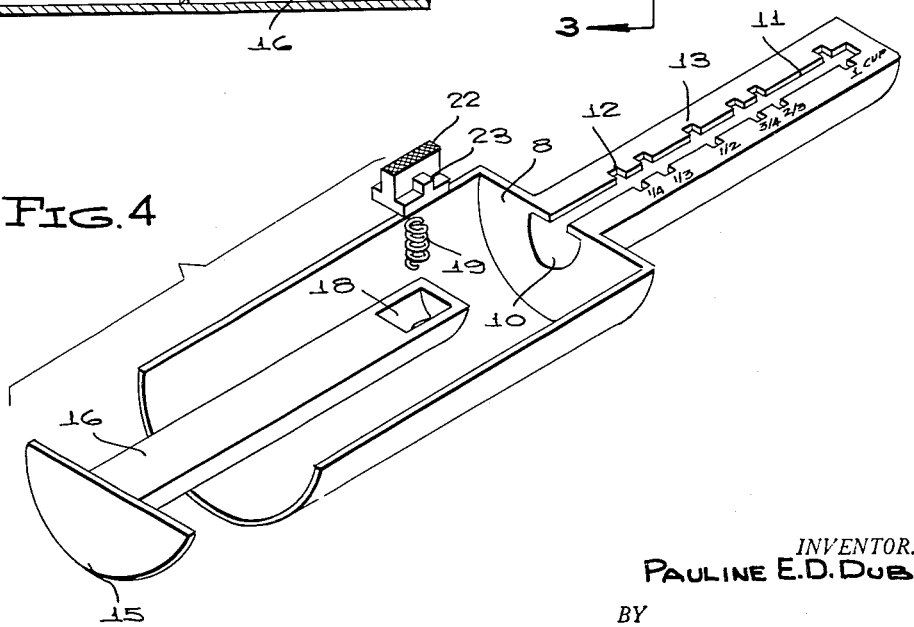
INVENTOR.
PAULINE E.D. DUBIN
BY
McMorrow, Berman + Davidson
ATTORNEYS 2,747,410

MEASURING SCOOP

Pauline E. D. Dubin, San Luis Obispo, Calif.

Application February 25, 1955, Serial No. 490,492

2 Claims. (Cl. 73—429)

This invention relates to improvements in measuring scoops for measuring shortening, as used in cookery, such as butter, lard, margarine, or solid or semisolid fats of any kind, and ejecting the measured quantity of material from the scoop, in a clean manner, and without any need for handling the measured material and thus avoiding any soiling of one's hands.

Further objects of this invention are to provide a scoop which is simple in construction, is constituted by a relatively few parts, is rugged in construction and hence is long lived in operation, and which is much more simple and efficient in operation than other scoops now available.

The following detailed description of one form which this invention can assume, and taken in connection with the accompanying drawings, is given solely by way of example, and is not to be conceived, in any manner whatsoever, in a limiting sense.

In the drawings:

Figure 1 is a perspective view of a scoop, in accordance with this invention;

Figure 2 is a sectional view, taken on line 2—2 of Figure 1, and viewed in the direction of the arrows;

Figure 3 is a sectional view, taken on line 3—3 of Figure 2, and viewed in the direction of the arrows; and Figure 4 is an exploded view of the structure of Figure 1.

Referring now to the drawings, the illustrated device comprises a scoop body 5, with a handle 6, extending from the rear thereof.

The scoop body, as shown, is semicylindrical in form, and has an open front end 7 lying in a plane at right angles to the length of the scoop body.

The rear end of the scoop body is closed by a semicircular wall 8, to which is connected the rearwardly extending handle 6, which as shown, is semicylindrical and smaller in cross section than the body 5, and axially arranged relative to the body 5.

The handle 6 is hollow throughout its length, and has a top wall 9 level with the upper edge of the end wall 8. The wall 8 has a semicircular opening 10 therethrough which is registered with the interior of the handle 6.

The hollow handle 6 has a slot 11 in its top wall 9 extending lengthwise thereof.

Pairs of opposed notches 12, 13, etc., are formed in the opposite edges of the slot 11, and at each pair of notches the top wall 9 is marked with measuring indicia 14, as "1 cup," "¼," "⅓," etc., for a purpose to appear clear as this description progresses.

Slidably disposed on the scoop body 5 is a semicircular ejector plate 15 snugly and slidably fitting the inner surface of the scoop body 5, positioned in a plane at right angles to the length of the scoop body.

Secured to the rear side of the ejector plate 15 is a semicircular cross section arm slidably engaged through the aperture 10 in the wall 8, as clearly shown in the drawings.

Releasable holding means for holding the ejector plate 15 in any desired measuring position in the scoop body 5 comprises a rectangular block-like button 17 confined for vertical movement in a socket 18 in the rear end of the arm 16 and biased upwardly by a spring 19, held between lugs 20 and 21 on the arm and button, respectively.

Button 17 has a base portion wider than the slot 11 engaging the under side of the handle top wall 9, and a narrow upper portion normally slidably engaged in the handle slot 11 and carrying opposed side lugs 22 and 24 which bear upon the top of the handle wall 9 and can spring into any one of the pairs of opposed notches 12, 13, etc., when the ejector plate 15 is positioned to bring them into registry.

The operation of the improved scoop, in accordance with this invention, is as follows:

Assuming that 1 cup of shortening is desired to be accurately measured and ejected from the scoop, the button 17 is depressed against the resistance of spring 19 until lugs 23 and 24 have passed below the opposed notches, as 12 and 13. The button is then moved and with it ejector plate 15, to the "1 cup" position, when it is released, to allow the holding lugs to engage the related pair of opposed notches.

The shortening is then scooped up, in usual manner, and can be leveled and cleaned off, as by any straight edge, flush with the top edges of the scoop body 5 and with the front edge 7 which is at right angles to the top edges, whereupon button 17 can be depressed and moved forwardly to cleanly eject the measured quantity of shortening from the front end 7 of the scoop body.

The above rather specific description, of one form which this invention can assume, has been given, solely by way of example, and is not intended, in any sense, in a limiting manner.

It is intended that all adaptations, modifications, and variations, of the form of invention described above, as fairly face within the scope of the appended claims, shall be covered by this disclosure.

Having described the invention, it is now claimed:

1. In a measuring scoop, a semi-cylindrical scoop body having an open front end and a rear end, a rear wall secured to and closing said rear end, said rear wall having a central opening therethrough, a hollow handle having an open front end registered with said opening and secured to said rear wall, said handle having a top wall provided with a longitudinal slot having a front end opening through said scoop body rear wall, a semi-circular ejector plate disposed slidably and conformably in said scoop body and positioned at right angles to the length of the scoop body, said ejector plate having a rear side, an arm disposed slidably through said opening and in said handle, said arm having a front end and a rear end, the front end of the arm being fixed to the rear side of the ejector plate, said arm having an upper side, said upper side being provided with a socket near the rear end of the arm, a button block having a base portion confined in said socket for vertical movement relative to the arm, said base portion being wider than said slot and engaged with the underside of the handle top wall, said button block having a narrower upper portion on said base portion slidably engaged through said slot, and spring means compressed between said arm and said button block and yieldably urging said button block in an upward direction.

2. In a measuring scoop, a semi-cylindrical scoop body having an open front end and a rear end, a rear wall secured to and closing said rear end, said rear wall having a central opening therethrough, a hollow handle having an open front end registered with said opening and secured to said rear wall, said handle having a top wall provided with a longitudinal slot having a front end opening through said scoop body rear wall, a semi-circular ejector plate disposed slidably and conformably in said scoop body and positioned at right angles to the length of the scoop body, said ejector plate having a rear side, an arm disposed slidably through said opening and in said handle, said arm having a front end and a rear end, the front end of the arm being fixed to the rear side of the ejector plate, said arm having an upper side, said upper side being provided with a socket near the rear end of the arm, a button block having a base portion confined in said socket for vertical movement relative to the arm, said base portion being wider than said slot and engaged with the underside of the handle top wall, said button block having a narrower upper portion on said base portion slidably engaged through said slot, and spring means compressed between said arm and said button block and yieldably urging said button block in an upward direction, said upper button block portion having lateral lugs on opposite sides thereof normally bearing upon the top of the handle top wall, and said top wall having longitudinal spaced pairs of transversely aligned notches opening into said handle slot into any of which the lateral lugs on the block button can be selectively engaged by depressing the button block against the resistance of said spring means with the lugs registered with a selected pair of notches.

References Cited in the file of this patent

UNITED STATES PATENTS

| | | |
|---|---|---|
| 993,560 | Skyum | May 30, 1911 |
| 2,396,943 | Frank | Mar. 19, 1946 |
| 2,555,956 | Chester | June 5, 1951 |
| 2,569,703 | Weiland | Oct. 2, 1951 |